United States Patent [19]

Leatherman

[11] 4,297,267

[45] Oct. 27, 1981

[54] HEXAVALENT CHROMIUM INTERNAL COLORANTS FOR DIOL BIS (ALLYL CARBONATE) POLYMERIZATES

[75] Inventor: Ivan R. Leatherman, Wadsworth, Ohio

[73] Assignee: PPG Industries, Inc., Pittsburgh, Pa.

[21] Appl. No.: 118,357

[22] Filed: Feb. 4, 1980

[51] Int. Cl.³ .................. C08K 3/10; C08K 3/18
[52] U.S. Cl. ................. 260/42.53; 260/37 PC; 252/180.3 R; 252/582; 106/302
[58] Field of Search ............. 260/42.53, 37 PC; 252/188.3, 300; 106/302

[56] References Cited

U.S. PATENT DOCUMENTS

| | | |
|---|---|---|
| 2,403,113 | 7/1946 | Muskat et al. ............... 260/78 |
| 3,216,958 | 11/1965 | Sheld ........................... 260/23.5 |
| 3,475,339 | 10/1969 | Foster et al. ................. 252/300 |
| 4,069,168 | 1/1978 | Leatherman et al. ........ 252/300 |

*Primary Examiner*—Carman J. Seccuro
*Attorney, Agent, or Firm*—Richard M. Goldman

[57] ABSTRACT

Disclosed is a liquid composition of diol bis (allyl carbonate) monomer and hexavalent chromium which may be polymerized by the addition of a polymerization initiating amount of an organic peroxide free radical polymerization initiator to yield a solid, green polymerizate having dispersed therethrough the reaction products of the diol bis (allyl carbonate) monomer, hexavalent chromium, and the organic peroxy free radical initiator.

9 Claims, No Drawings

HEXAVALENT CHROMIUM INTERNAL COLORANTS FOR DIOL BIS (ALLYL CARBONATE) POLYMERIZATES

DESCRIPTION OF THE INVENTION

The invention described herein relates to uniformly colored diol bis(allyl carbonate) compositions, i.e., liquids and polymerizates thereof, and to the methods of preparing the uniformly colored compositions.

Transparent polymerizates of diol bis(allyl carbonates), for example, diethylene glycol bis(allyl carbonate), may be prepared by the organic peroxide free radical initiated polymerization of diol bis(allyl carbonate) monomers. The resulting polymerizates may then be colored by dip dyeing in heated solutions of various organic dyes.

Dip dyeing is utilized because many surface colorants are not colorizing when utilized as internal colorants, being attacked by the peroxide free radical polymerization initiators. The attack by the peroxide free radical polymerization initiators is believed to cause the colorants to prematurely decompose, evidenced by bubbling, discoloration, haze, cloudiness, nonuniformity of coloration, blistering and cracking.

Applicant has found that hexavalent chromium, added to the monomer mix, provides an internal colorant which is colorizing after organic peroxide free radical initiated polymerization.

DETAILED DESCRIPTION OF THE INVENTION

It has now been found that hexavalent chromium may be incorporated in liquid diol bis(allyl carbonate) and solid polymerizates of diol bis(allyl carbonates) in order to produce colored liquids, and lenses, sheets or other shapes which are substantially optically clear and haze free.

In accordance with the practice of the invention herein contemplated, hexavalent chromium may be dissolved or dispersed uniformly in a diol bis(allyl carbonate) monomer, for example, diethylene glycol bis(allyl carbonate), to provide a colored composition which may then be polymerized, by known methods of polymerization, to produce colored polymerizates having uniformly dispersed internal colorants therein.

By a uniformly dispersed colorant is meant that individual colorant particles, if any, are not detectable at less than ten magnification, and that colorant striations or segregation, if any, is not detectable at less than ten magnification.

As used herein hexavalent chromium means water soluble, alcohol soluble, diol bis(allyl carbonate) soluble chromium (VI) compounds, exemplified by $CrO_3$, $CrO_4^=$, $Cr_2O_7^=$, $HCrO_4$, $H_2CrO_4$, $H_2Cr_2O_7$, $HCrO_7^-$, the alkali metal chromates $MCrO_4$, the alkali metal dichromates $M_2Cr_2O_7$, the alkali metal chlorchromates, $M[CrO_3Cl]$, where M is an alkali metal, preferably sodium or potassium, and the chlorochromate anion, $CrO_3Cl^-$.

As herein contemplated the colorant may be prepared by dissolving $CrO_3$ in an aqueous alkali metal hydroxide solution, e.g., an aqueous NaOH solution or an aqueous KOH solution, whereby to form $CrO_4^=$, chromate ion. Thereafter, aqueous hydrochloric acid, HCl is added to the solution to form $Cr_2O_7^=$, dichromate ion. Thereafter an excess of chloride is added to the solution and the solution is boiled, whereby to form alkali metal chlorochromate, $M[CrO_3Cl]$, where M is as defined above. The chlorochromate may be recovered as a crystalline solid, either by cooling and recrystallization or by evaporating to dryness. The chlorochromate crystals are useful as the internal colorants herein contemplated.

Monomers which may be used in the practice of this invention are liquid diol bis(allyl carbonate) monomers, for example, diethylene glycol bis(allyl carbonate). Alternatively, the monomers may be compounds in which the allyl groups be substituted at the 2 position with a halogen, for example, chlorine, or bromine, or a 1–4 carbon alkyl group, preferably a methyl or ethyl group, and the diol group may be an alkyl group, an alkyl ether, or an alkyl polyether group, having a total of from 2–10 carbons and oxygens. The monomers are represented by the formula:

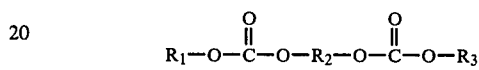

in which $R_1$ and $R_3$ are allyl groups and $R_2$ is the diol group. $R_1$ and $R_3$ may be represented by the formula:

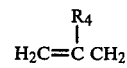

wherein $R_4$ may be hydrogen, halogen, or 1–4 carbon alkyl group.

Specific examples of $R_1$ and $R_3$ include allyl, 2-chloro allyl, 2-bromo allyl, 2-iodo allyl, 2-fluoro allyl, 2-methyl allyl, 2-ethyl allyl, 2-isopropyl allyl, 2-n-propyl allyl, and 2-n-butyl allyl groups. Such compounds and methods for making them are disclosed in U.S. Pat. Nos. 2,370,567 and 2,403,113.

Specific examples of $R_2$ include alkyl groups, such as ethylene, trimethylene, methylethylene, tetramethylene, ethylethylene, pentamethylene, hexamethylene, 2-methylhexamethylene, octamethylene, decamethylene groups, alkylene ether groups, such as $-CH_2-O-CH_2-$, $-CH_2CH_2-O-CH_2CH_2-$, $-CH_2-O-CH_2CH_2-$, and $-CH_2CH_2CH_2-O-CH_2CH_2CH_2-$, and alkylene polyether groups, such as $-CH_2CH_2O-CH_2CH_2O-CH_2CH_2-$, and $-CH_2-O-CH_2CH_2-O-CH_2-$ groups.

Specific examples of such monomers include ethylene glycol bis(2-chloro allyl carbonate), diethylene glycol bis(2-methyl allyl carbonate), triethylene glycol bis(allyl carbonate), propylene glycol bis(2-ethyl allyl carbonate), 1,3-propanediol bis(allyl carbonate), 1,3-butanediol bis(ally carbonate), 1,4-bis butane diol bis(2-bromo allyl carbonate), dipropylene glycol bis(allyl carbonate), trimethylene glycol bis(2-ethyl allyl carbonate), and pentamethylene glycol bis(allyl carbonate). Especially preferred in the practice of this invention is diethylene glycol bis(allyl carbonate).

The above described monomers as well as mixtures thereof, containing hexavalent chromium, may be polymerized by heat, radiation, or catalysts. Most frequently catalysis is used and the preferred catalysts are organic free radical initiators, exemplified by peroxide initiators. Organic peroxide free radical initiators include diisopropyl peroxy dicarbonate, di-sect-butyl peroxy dicarbonate lauryl peroxide, and benzyol peroxide.

There may be incorporated in the mixture of monomers and chromic acid other monomers such as vinyl acetate, methyl acrylate, methyl methacrylate, acrylic acid, and methacrylic acid in minor proportions, in order to obtain copolymers, and polymer blend alloys having desired physical properties.

The addition of hexavalent chromium to a diol bis(allyl carbonate) monomer requires little modification in the methods ordinarily used to effect polymerization of the monomer.

Typically, the monomers are polymerized under airtight conditions. An organic peroxide initiator, e.g., a peroxy carbonate free radical initiator, is dissolved in the monomer in a concentration of from about 0.1 to about 10 weight percent, basis weight of the diol bis(allyl carbonate) monomer and preferably from about 2 to about 5 weight percent. The composition of catalyst, monomer, and chromic acid is then heated to effect the desired polymerization. Temperatures between about 25° and 125° C. and reaction times from about 45 minutes to about 36 hours are preferred. Heating may be a constant temperature, at linear increasing temperatures, or at step-wise increasing temperatures. Heating cycles useful in carrying out the polymerization herein contemplated are described in Dial et al, "Polymerization Control in Casting a Thermosetting Resin", *Industrial Engineering Chemistry*, Vol. 49, page 2447 (December 1955).

Hexavalent chromium may be incorporated in a monomer or mixture thereof at a colorizing level. That is, above about 0.1 weight percent basis weight of the diol bis (allyl carbonate), up to the solubility limit thereof, i.e., up to about 1 percent. Above the solubility limit, haze, cloudiness, and bubbles may be present in the polymerizate. While this is undesirable for optical purposes, it may however, not be undesirable for decorative uses or nonoptical uses.

As herein contemplated there is prepared a liquid composition comprising a diol bis (allyl carbonate) monomer and hexavalent chromium, for example, a liquid composition containing diethylene glycol bis (allyl carbonate) and the reaction product of $CrO_3$ first with an alkali metal hydroxide such as sodium hydroxide or potassium hydroxide, followed by excess hydrochloric acid, and recovery of the colored solid. The resulting liquid composition is polymerized to yield a solid green polymerizate having dispersed therethrough the reaction products of the diol bis(allyl carbonate) monomer, Cr(VI), and the organic peroxy free radical initiator, for example, the reaction products of diethylene glycol bis(allyl carbonate), hexavalent chromium, and diisopropyl proxy dicarbonate. This solid, green polymerizate may be prepared by utilizing the above described liquid composition, adding the polymerization initiating amount of the organic peroxide free radical polymerization initiator, i.e., diisopropyl peroxy dicarbonate or benzoyl peroxide, to the liquid composition whereby to form the solid, internally colored green transparent article.

The following example illustrates how the present invention may be practiced. Although the example describes a polymerizate of diethylene glycol bis(allyl carbonate), the method described therein may be utilized with other diol bis(allyl carbonate) monomers or mixtures thereof.

EXAMPLE

Hexavalent chromium was dissolved in diethylene glycol bis(allyl carbonate), and the resulting liquid composition was polymerized to yield a green polymerizate.

Approximately 0.5 gram of chromic acid, $CrO_3$, was dissolved in aqueous NaOH solution, and thereafter acidified with excess aqueous HCl. The resulting clear, brown solution was boiled to dryness. Approximately one hundred grams of diethylene glycol bis(allyl carbonate) was added to the dry cake. The resulting liquid solution turned dark green.

The dark green solution was catalyzed with 3.5 weight percent diisopropyl peroxy dicarbonate, basis diethylene glycol bis(allyl carbonate), and cured according to the following temperature program:

| Elapsed Time (Hours) | Temperature (°C.) |
| --- | --- |
| 0 | 42° |
| 2 | 44° |
| 4 | 45° |
| 6 | 46° |
| 8 | 47° |
| 10 | 48° |
| 12 | 50° |
| 14 | 52° |
| 16 | 54.5° |
| 18 | 57° |
| 20 | 61° |
| 22 | 69° |
| 23 | 79° |
| 24 | 98° |
| 24.5 | 100° |

The resulting polymerizate was dark green and substantially free of haze.

While this invention has been described with reference to specific details and embodiments thereof, the description is not intended to limit the invention, the scope of which is as defined in the claims appended hereto.

I claim:
1. A liquid composition comprising diol bis(allyl carbonate) monomer and chlorochromate ion.
2. The liquid composition of claim 1 wherein the monomer is diethylene glycol bis(allyl carbonate).
3. The liquid composition of claim 1 wherein the chlorochromate ion is the reaction product of aqueous dichromate ion and excess hydrochloric acid.
4. A solid, green polymerizate having dispersed therethrough the reaction products of a diol bis(allyl carbonate) monomer, chlorochromate ion, and an organic peroxy free radical initiator.
5. The solid, green polymerizate of claim 4 wherein the monomer is diethylene glycol bis(allyl carbonate).
6. The solid, green polymerizate of claim 4 wherein the chlorochromate ion is the reaction product of aqueous dichromate ion and excess hydrochloric acid.
7. A method of preparing an internally colored, green, transparent article, which method comprises:
   preparing a liquid composition comprising a diol bis(allyl carbonate) monomer, and a colorizing amount of chlorochromate ion; and
   adding a polymerization initiating amount of an organic peroxide free radical polymerization initiator to the liquid composition whereby to form a solid polymerizate thereof.
8. The method of claim 7 wherein the monomer is diethylene glycol bis(allyl carbonate).
9. The method of claim 7 wherein the chlorochromate ion is a reaction product of aqueous dichromate ion and excess hydrochloric acid.

* * * * *